United States Patent
Hu et al.

(10) Patent No.: US 10,070,495 B2
(45) Date of Patent: Sep. 4, 2018

(54) CONTROLLING THE DRIVE SIGNAL IN A LIGHTING FIXTURE BASED ON AMBIENT TEMPERATURE

(71) Applicant: Cree, Inc., Durham, NC (US)

(72) Inventors: Yuequan Hu, Morrisville, NC (US); Eric Low, North Point (HK)

(73) Assignee: Cree, Inc., Durham, NC (US)

( * ) Notice: Subject to any disclaimer, the term of this patent is extended or adjusted under 35 U.S.C. 154(b) by 0 days.

(21) Appl. No.: 14/702,462

(22) Filed: May 1, 2015

(65) Prior Publication Data
US 2016/0323957 A1    Nov. 3, 2016

(51) Int. Cl.
| | | |
|---|---|---|
| H05B 37/00 | (2006.01) | |
| H05B 39/00 | (2006.01) | |
| H05B 41/00 | (2006.01) | |
| H05B 33/08 | (2006.01) | |
| G09G 3/34 | (2006.01) | |

(52) U.S. Cl.
CPC ..... *H05B 33/0854* (2013.01); *H05B 33/0815* (2013.01); *H05B 33/0818* (2013.01); *G09G 3/3406* (2013.01); *H05B 33/0809* (2013.01); *H05B 33/0824* (2013.01); *H05B 33/0842* (2013.01); *H05B 33/0845* (2013.01); *H05B 33/0851* (2013.01); *Y02B 20/345* (2013.01); *Y02B 20/346* (2013.01); *Y02B 20/347* (2013.01); *Y02B 20/42* (2013.01)

(58) Field of Classification Search
CPC ............ H05B 33/0815; H05B 33/0824; H05B 33/0845; H05B 33/0809; H05B 33/0851; H05B 33/0842; H05B 37/02; Y02B 20/346; Y02B 20/347; Y02B 20/345; Y02B 20/42; G09G 3/3406
USPC ..... 315/186, 185 R, 291, 307, 122; 323/282, 323/284
See application file for complete search history.

(56) References Cited

U.S. PATENT DOCUMENTS

| | | | |
|---|---|---|---|
| 2006/0202914 A1* | 9/2006 | Ashdown | H05B 33/0803 345/46 |
| 2011/0140626 A1* | 6/2011 | Aurongzeb | H05B 33/0845 315/250 |
| 2014/0210374 A1* | 7/2014 | Schoel | H05B 33/0851 315/297 |
| 2014/0265899 A1* | 9/2014 | Sadwick | H05B 33/0812 315/200 R |
| 2014/0361701 A1* | 12/2014 | Siessegger | H05B 33/0803 315/200 R |
| 2016/0128144 A1* | 5/2016 | Tikkanen | H05B 33/0815 315/301 |

* cited by examiner

*Primary Examiner* — Alexander H Taningco
*Assistant Examiner* — Christian L Garcia
(74) *Attorney, Agent, or Firm* — Withrow & Terranova, P.L.L.C.

(57) ABSTRACT

A lighting fixture includes a solid-state lighting source, such as an LED light source. A control module of the lighting fixture uses temperature sensing circuitry to determine a relative ambient temperature. When the ambient temperature is above a defined ambient temperature threshold, a drive signal is provided to the solid-state light source at a target drive level that corresponds to a normal light output level. When the ambient temperature is below the ambient temperature threshold, the drive signal is provided to the solid-state light source at a reduced drive level, which is lower than the target drive level.

20 Claims, 9 Drawing Sheets

CONTROLLING THE DRIVE SIGNAL IN A LIGHTING FIXTURE BASED ON AMBIENT TEMPERATURE

FIELD OF THE DISCLOSURE

The present disclosure relates to lighting fixtures, and in particular to controlling the drive signal in a lighting fixture based on ambient temperature.

BACKGROUND

In recent years, a movement has gained traction to replace incandescent light bulbs with lighting fixtures that employ more efficient lighting technologies as well as to replace relatively efficient fluorescent lighting fixtures with lighting technologies that produce a more pleasing, natural light. One such technology that shows tremendous promise employs light emitting diodes (LEDs). Compared with incandescent bulbs, LED-based fixtures are much more efficient at converting electrical energy into light and are longer lasting while producing light that is very natural. Compared with fluorescent lighting fixtures, LED-based fixtures are capable of producing light that is more natural and rendering colors more accurately. Unlike fluorescent lighting fixtures, LED-based fixtures are easily dimmed, turn on quickly, require less maintenance, and do not use mercury. As a result, lighting fixtures that employ LED technologies are replacing incandescent and fluorescent bulbs in residential, commercial, and industrial applications.

In many commercial and industrial applications, LED-based lighting fixtures are subjected to extreme environmental conditions. Users expect the LED-based lighting fixtures to meet or exceed the performance of the incandescent and fluorescent fixtures in all conditions, including extreme conditions. As such, there is continuing need to ensure that the LED-based lighting fixtures perform as well as their competitors throughout a broad range of environmental conditions.

SUMMARY

The present disclosure relates to a lighting fixture that includes a solid-state lighting source, such as an LED light source. A control module of the lighting fixture uses temperature sensing circuitry to determine a relative ambient temperature. When the ambient temperature is above a defined ambient temperature threshold, a drive signal is provided to the solid-state light source at a target drive level that corresponds to a normal light output level. When the ambient temperature is below the ambient temperature threshold, the drive signal is provided to the solid-state light source at a reduced drive level, which is lower than the target drive level.

The normal light output level, and thus the target drive level, may vary depending on the dimming level that is set for the lighting fixture. The drive signal may be kept at the reduced drive level for a defined period of time, until the ambient temperature rises above the ambient temperature threshold, or the like. The reduced drive level for the drive signal may be fixed or variable. When variable, the reduced drive level may take on various profiles that include linear or non-linear ramps, one or more steps, and the like. Operating at reduced drive levels may initiate upon startup or during normal operation when the ambient temperature falls below the ambient temperature threshold.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Figure 1:
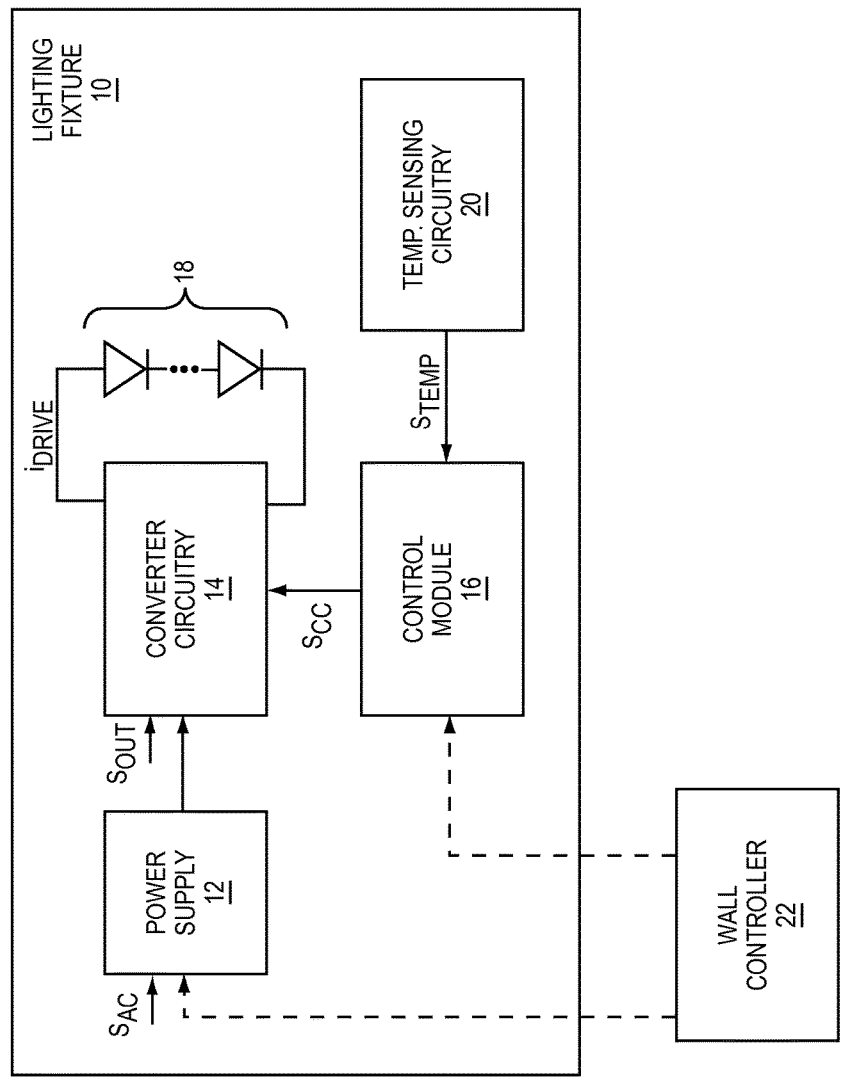
FIG. 1 is block diagram of a lighting fixture according to the one embodiment of the disclosure.

With reference to FIG. 1, a block diagram of a lighting fixture 10 is illustrated according to one embodiment. The lighting fixture 10 generally includes a power supply 12, converter circuitry 14, a control module 16, and an array of LEDs 18 or other solid state lighting source. The power supply 12 converts an alternating current (AC) supply signal $S_{AC}$ to a direct current (DC) power supply output signal $S_{OUT}$. The converter circuitry 14 receives the power supply output signal $S_{OUT}$ and provides a drive signal $i_{DRIVE}$ to the LED array 18. The converter circuitry 14 may be configured as a buck, boost, or buck-boost converters. The converter circuitry 14 illustrated and described further below is a buck converter topology. Those skilled in the art will recognize various converter topologies that will benefit from the concepts and disclosures herein. For example, a single-ended primary-inductance (SEPIC) converter is just one example of a buck-boost topology. The power supply 12 is illustrated as a switching power supply, which may take on various topologies; however, the power supply 12 does not need to be a switching power supply.

The level of the drive signal $i_{DRIVE}$ is controlled by the control module 16 using a converter control signal $S_{CC}$. The output level of the light generated by the LED array 18 is a function of the drive signal $i_{DRIVE}$, and as such, the control module 16 controls the drive signal $i_{DRIVE}$ with the converter control signal $S_{CC}$ to adjust the output level of the light provided by the LED array 18.

The power supply 12 rectifies the AC supply signal $S_{AC}$ as well as provides power factor correction (PFC) when generating the power supply output signal $S_{OUT}$. The term DC is used broadly, as the power supply output signal may have substantial ripple or level variations depending on the design and output capacitance of the power supply 12 as well as the load presented to the power supply 12.

The output capacitance of the power supply 12 and the converter circuitry 14 may vary substantially with temperature. In extremely cold environments to which outdoor lighting fixtures 10 are often subjected, the output capacitance of the power supply 12 and the converter circuitry 14 may decrease by 50% or more as temperature decreases from room temperature to −40 C. (Celsius). A reduction in output capacitance of the power supply 12 and the converter circuitry 14 directly affects the ability of the converter circuitry 14 to provide the drive signal $i_{DRIVE}$ at a desired operating level when the lighting fixture 10 is initially turned on as well as during normal operation. As described further below, the reduction in output capacitance caused by very low temperatures can actually result in too much current being provided to the LED array 18 in certain designs. When the control module 16 is configured to provide over-current protection (OCP), the control module 16 may shut off the drive signal provided to the LED array 18 for a period of time when the LED array 18 is receiving too much current.

As long as the output capacitance remains low, the above scenario may repeat when the control module 16 restarts the converter circuitry 14 after over-current protection has been triggered. The repeated activation of the over-current protection results in the light output from the LED array 18 rapidly flickering on and off. Needless to say, such flickering is undesirable and unacceptable.

The flickering often continues until the output capacitance of the power supply 12 and the converter circuitry 14 rises to a level sufficient to meet the demands of the converter circuitry 14. The output capacitance will generally rise to an acceptable level once the capacitor or capacitors that provide the output capacitance reach an internal temperature above a certain threshold. As those skilled in the art will appreciate, the requisite capacitance or internal temperature that is needed for proper operation will vary based on the design of the various components of the lighting fixture 10 and the drive signal $i_{DRIVE}$ needed to achieve a desired light output level.

To address the above scenario, the control module 16 uses temperature sensing circuitry 20 to determine a relative ambient temperature associated with the electronics of the lighting fixture 10. When the ambient temperature is above a defined ambient temperature threshold, the drive signal $i_{DRIVE}$ is provided to the LED array 18 at a target drive level $i_{TARGET}$ that corresponds to a normal light output level. Notably, the normal light output level, and thus the target drive level $i_{TARGET}$, may vary depending on the dimming level that is set for the lighting fixture 10. A particular drive level may correspond to a desired current level, voltage level, power level, or the like.

Figure 2:
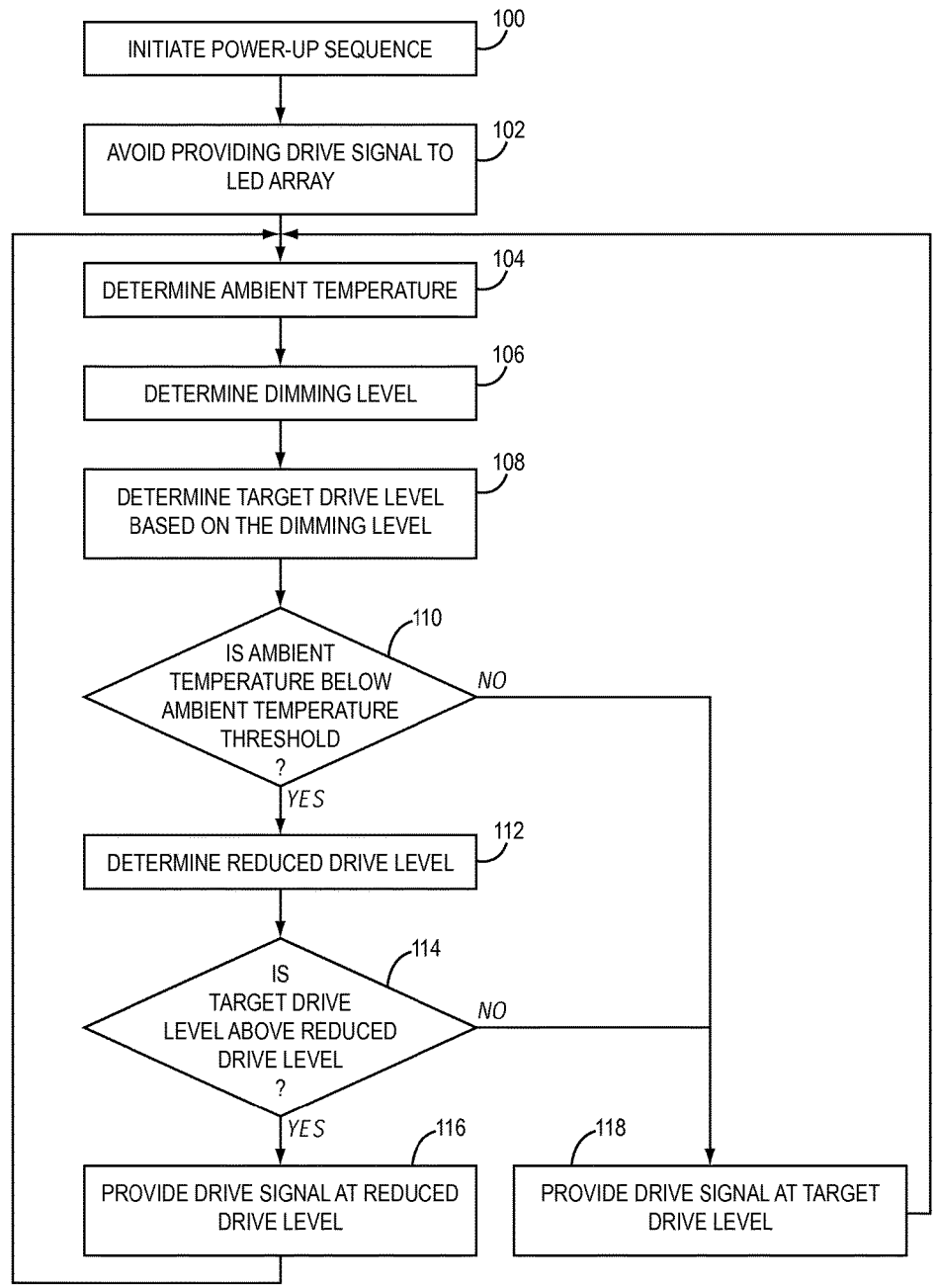
FIG. 2 is flow diagram that illustrates operation of a lighting fixture according to one embodiment of the disclosure.

When the ambient temperature is below the ambient temperature threshold, the drive signal $i_{DRIVE}$ is provided to the LED array 18 at a reduced drive level $i_{REDUCED}$, which is lower than the target drive level $i_{TARGET}$. The drive signal may be kept at the reduced drive level for a defined period of time or until the ambient temperature rises above the ambient temperature threshold. The reduced drive level $i_{REDUCED}$ for the drive signal $i_{DRIVE}$ may be fixed or variable. Operation of the control module 16 according to one exemplary embodiment is described below in association with FIG. 2.

Assume that lighting fixture 10 is either powered off via a wall controller 22, such as that shown in FIG. 1, or other control mechanism. As such, no drive signal $i_{DRIVE}$ is being provided to the LED array 18 by the converter circuitry 14. When power is supplied to the lighting fixture 10, the control module 16 will initiate a power-up sequence (Step 100) and take any necessary measures to avoid having the converter circuitry 14 provide a drive signal to the LED array 18 until later in the power-up sequence (Step 102).

The control module 16 will determine the ambient temperature based on information obtained from the temperature sensing circuitry 20 (Step 104) as well as determine a desired dimming level based on information provided directly or indirectly by the wall controller 22 or other control mechanism (Step 106). Based on the dimming information, the control module 16 will determine a target drive level $i_{TARGET}$ based on the dimming level (Step 108). For example, the target drive level $i_{TARGET}$ is set at a full (or desired maximum) output level if the dimming level is 100%. The target drive level is set to 60% of the full output level if the dimming level is 60%.

Next, the control module 16 will determine whether the ambient temperature is below the ambient temperature threshold (Step 110). If the ambient temperature is below the ambient temperature threshold, the control module 16 will determine the reduced drive level $i_{REDUCED}$ (Step 112). The reduced drive level $i_{REDUCED}$ may be substantially fixed (constant) or variable as well as have a profile that is predefined or a function of time, ambient temperature, or a combination thereof. Several examples are provided further below.

The control module 16 will determine whether the target drive level $i_{TARGET}$ is above the reduced drive level $i_{REDUCED}$ (Step 114). If the target drive level $i_{TARGET}$ is above the reduced drive level $i_{REDUCED}$, the control module 16 will control the converter circuitry 14 to provide a drive signal $i_{DRIVE}$ to the LED array 18 at the reduced drive level $i_{REDUCED}$ (Step 116). If the target drive level $i_{TARGET}$ is below the reduced drive level $i_{REDUCED}$, the control module 16 will control the converter circuitry 14 to provide the drive signal $i_{DRIVE}$ to the LED array 18 at the target drive level $i_{TARGET}$ (Step 118).

Returning to the decision of Step 110, if the ambient temperature is above the ambient temperature threshold (Step 110), the control module 16 will control the converter circuitry 14 to provide the drive signal $i_{DRIVE}$ to the LED array 18 at the target drive level $i_{TARGET}$ (Step 118). The process will repeat in an iterative manner during operation, wherein reduced drive levels $i_{REDUCED}$ may be triggered during normal operation if the ambient temperature drops below the ambient temperature threshold. After a period of time or once the ambient temperature rises above the ambient temperature threshold, the drive signal $i_{DRIVE}$ is provided at the target drive level $i_{TARGET}$.

While the embodiment described above provides a more sophisticated control scheme that takes into consideration dimming levels and tries to maintain target drive level unless they exceed a reduced drive level $i_{REDUCED}$ in low temperature conditions, the control module 16 may simply control the converter circuitry 14 to provide the drive signal $i_{DRIVE}$ to the LED array 18 at the reduced drive level $i_{REDUCED}$ any time the ambient temperature drops below the ambient temperature threshold, regardless of dimming level.

Further, multiple ambient temperature thresholds may be defined, wherein each ambient temperature threshold corresponds to a different reduced drive level $i_{REDUCED}$ for the drive signal $i_{DRIVE}$. Also, the reduced drive levels $i_{REDUCED}$ may vary and be a function of time and ambient temperature, wherein higher reduced drive levels will correspond with higher ambient temperature, and vice versa. In the claims that follow, an element describing an ambient temperature threshold will cover embodiments ranging from those that use only one ambient temperature threshold to those that have multiple distinct ambient temperature thresholds (tiered) or continuously variable ambient temperature thresholds (functions). The term ambient temperature is a relative term and need not be correlated to specific temperature measurements.

Figure 3:
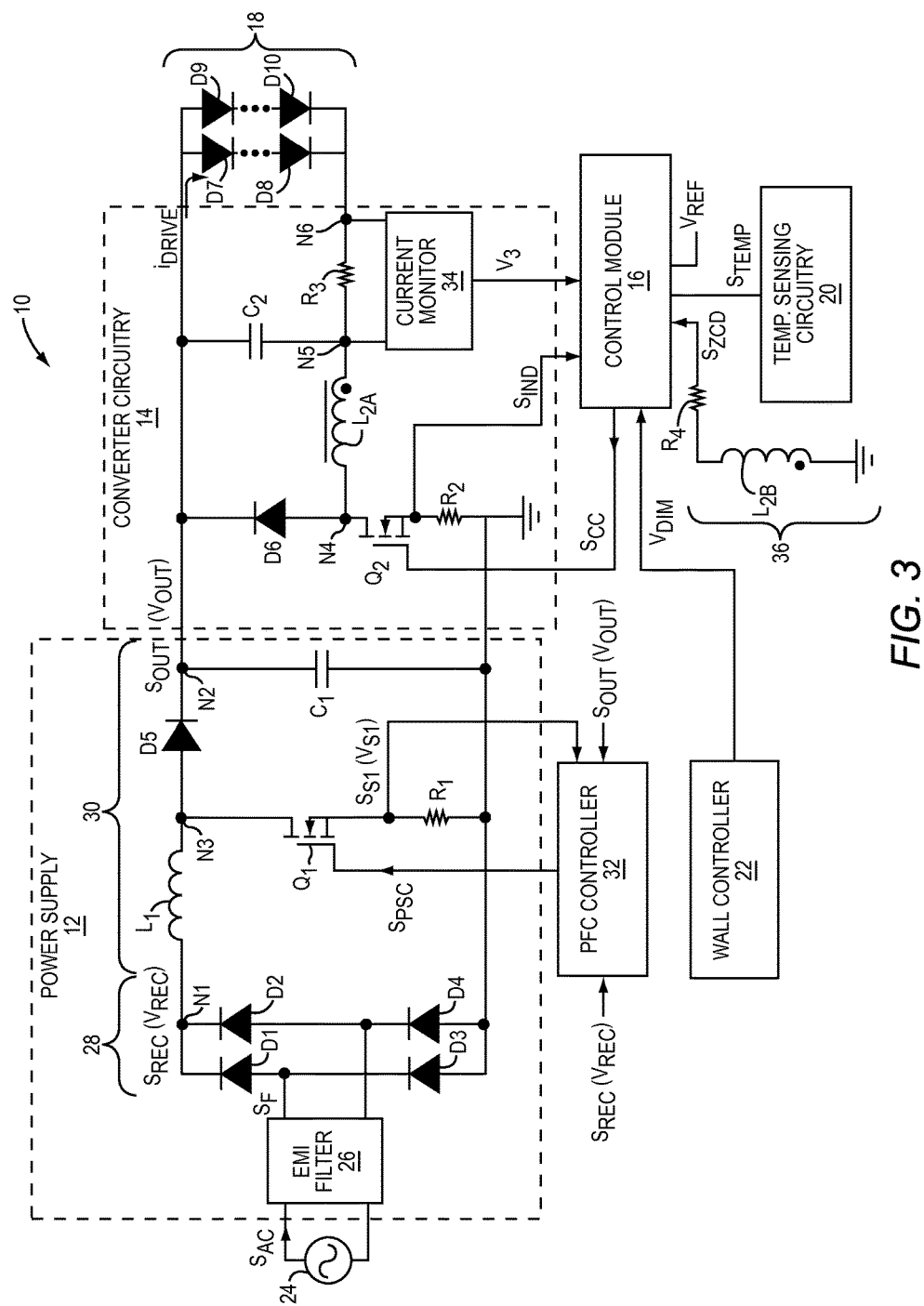
FIG. 3 is a schematic diagram of a lighting fixture according to one embodiment of the disclosure.

FIG. 3 provides a more detailed schematic of a lighting fixture 10 according to one embodiment. As illustrated, an AC supply signal, $S_{AC}$, is provided to the power supply 12 of the lighting fixture 10 by an AC power source 24. The power supply 12 generally includes an electromagnetic interference (EMI) filter 26, rectifier circuitry 28, switching circuitry 30, and a power factor controller 32 for controlling the switching circuitry 30. The EMI filter 26 filters out excessive EMI that is generated by the PFC controller 32 and the converter circuitry 14 The AC supply signal $S_F$ is rectified by the rectifier circuitry 28, which includes diodes D1 through D4 in a full-wave rectifier configuration, to provide a rectified signal $S_{REC}$. The rectified signal $S_{REC}$ is supplied to the switching circuitry 30 and monitored by the PFC controller 32.

The switching circuitry 30 includes inductor $L_1$, diode D5, output capacitor $C_1$, switching transistor $Q_1$, and first sensing resistor $R_1$. The inductor $L_1$ and diode D1 are connected in series between an input node N1 and an output node N2. Output capacitor $C_1$ is coupled in a shunt configuration between the output node N2 and ground. Switching transistor $Q_1$ and first sensing resistor $R_1$ are coupled in series between switching node N3 and ground. Switching transistor $Q_1$ is configured as an N-channel field effect transistor (FET). The PFC controller 32 drives the gate of switching transistor $Q_1$ with a power supply control signal $S_{PSC}$ to switch switching transistor $Q_1$ on and off, and thus, control the voltage $V_{OUT}$ of the power supply output signal $S_{OUT}$ at output node N2 and provide power factor correction.

When switching transistor $Q_1$ is off, current will flow through inductor $L_1$ and diode D5 to charge output capacitor $C_1$. When switching transistor $Q_1$ is on, current is redirected through switching transistor $Q_1$ and the first sensing resistor $R_1$. The voltage drop across the first sensing resistor $R_1$ is indicative of the current flowing through inductor $L_1$ and provides a first sense signal $S_{S1}$ having a voltage $V_{S1}$. The voltages associated with the first sense signal $S_{S1}$ ($V_{S1}$), the power supply output signal $S_{OUT}$, ($V_{OUT}$), and the rectified signal $S_{REC}$ ($V_{REC}$) are used by the PFC controller 32 to generate the power supply control signal $S_{PSC}$, and thus regulate the voltage ($V_{OUT}$) of the power supply output signal $S_{OUT}$ to a desired level and with the appropriate power factor correction.

The converter circuitry 14 that is illustrated operates as a buck converter and includes a diode D6, a switching transistor $Q_2$, a second sense resistor $R_2$, a third sense resistor $R_3$, an inductor $L_{2A}$, an output capacitor $C_2$, and current monitor circuitry 34. The diode D6, switching transistor $Q_2$, and the second sense resistor $R_2$ are coupled in series between node N2 and ground. Capacitor $C_2$ and inductor $L_{2A}$ are coupled in series with one another and in parallel with the diode D6 between the output node N2 and node N4. Third sense resistor $R_3$ and the LED array 18 are coupled in series with one another and in parallel with output capacitor $C_2$ between the output node N2 and node N5. As such, inductor $L_{2A}$ is coupled between nodes N4 and N5. Third sense resistor $R_3$ is coupled between nodes N5 and N6, and the LED array 18 is coupled between the output node N2 and node N6. The LED array 18 is shown as one or more strings of LEDs D7-D10, wherein each string may include LEDs D7-D10 that output light of the same or different colors.

Current monitor circuitry 34 resides across the third sense resistor $R_3$ and functions to provide an LED current sense signal $S_{LED}$, wherein the voltage ($V_{R3}$) across the third sense resistor $R_3$ corresponds to the drive current $i_{DRIVE}$ that flows through the LED array 18. The voltage drop ($V_{R2}$) across the second sense resistor $R_2$ corresponds to the current flowing through the second inductor $L_{2A}$ and is used as an inductor current sense signal $S_{IND}$. The inductor $L_{2A}$ is inductively coupled to inductor $L_{2B}$. Inductor $L_{2B}$ forms part of a zero crossing detection (ZCD) circuit 36 that is used by the control module 16 to detect when the current in inductor $L_{2A}$ drops to zero. The zero crossing detection circuit 36 is shown as a resistor $R_4$ in series with the inductor $L_{2B}$ and provides a ZCD signal $S_{ZCD}$ to the control module 16.

The control module 16 provides the converter control signal $S_{CC}$ to the gate of switching transistor $Q_2$, which is also an N-channel FET in the illustrated embodiment. The converter control signal $S_{CC}$ is configured to turn switching transistor $Q_2$ on and off to regulate the drive current $i_{DRIVE}$ in a desired fashion. As described below, the control module 16 is further responsive to the sensed temperature signal $S_{TEMP}$ that is provided by temperature sensing circuitry 20.

In normal operation, the control module 16 repeatedly turns transistor $Q_2$ on and off using the converter control signal $S_{CC}$. When transistor $Q_2$ is turned on by the converter control signal $S_{CC}$, the current through inductor $L_{2A}$ ramps up at a slope of $(V_{OUT}-V_{LED})/L$ as long as transistor $Q_2$ remains on, wherein $V_{OUT}$ is the voltage of the power supply output signal $S_{OUT}$, $V_{LED}$ is the voltage across the LED array 18, and L is the inductance of the inductor $L_{2A}$. When the voltage of the inductor current sense signal $S_{IND}$ reaches the set threshold voltage of VREF, the control module 16 turns transistor $Q_2$ off. When transistor $Q_2$ turns off, current continues to flow through inductor $L_{2A}$. However, instead of flowing through transistor $Q_2$, the current flowing though inductor $L_{2A}$ flows through diode D2. The current flowing through the inductor $L_{2A}$ decreases at a slope of $-V_{LED}/L$ when transistor $Q_2$ is off. Once current flowing through inductor $L_{2A}$ reaches zero, the voltage across inductor $L_{2B}$, which is inductively coupled to inductor $L_{2A}$, reaches a minimum. When the voltage across inductor $L_{2B}$ reaches the minimum, the control module 16 will turn on transistor $Q_2$, wherein the cycle will repeat.

Figure 4:
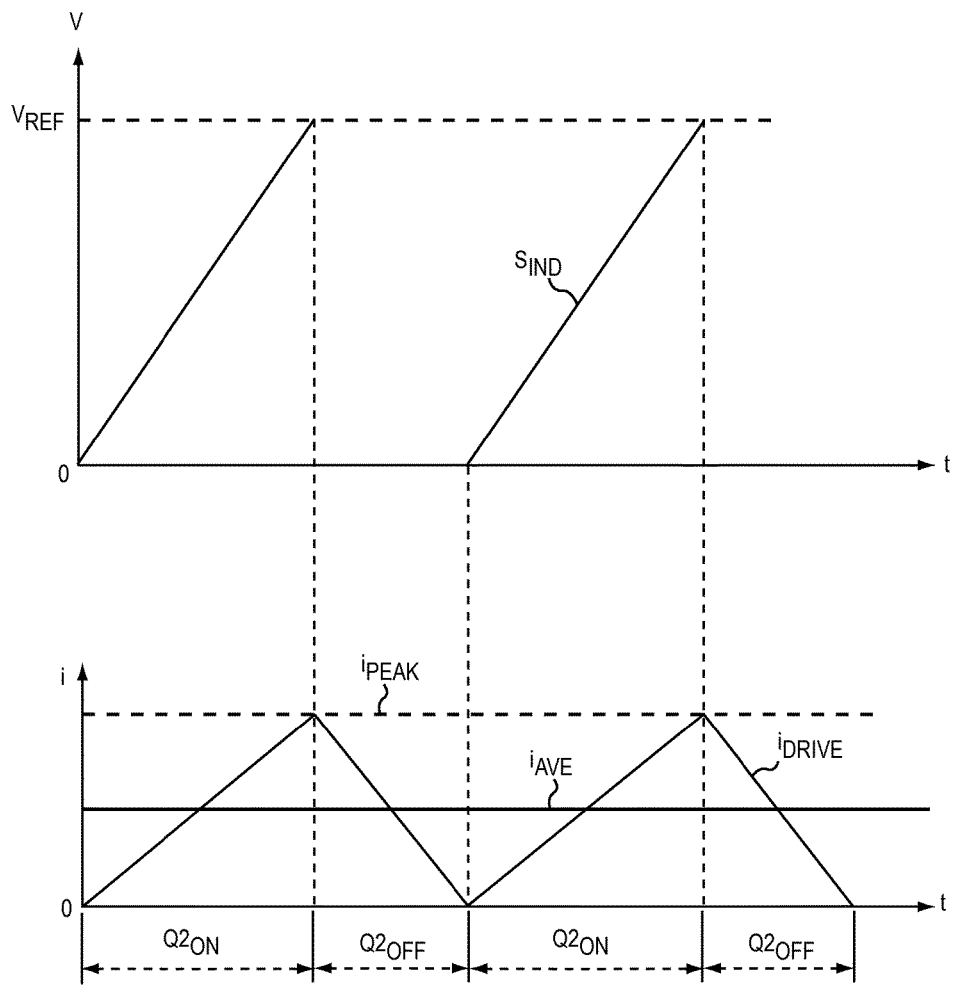
FIG. 4 is graph that shows the relationship between the drive current $i_{DRIVE}$ and the voltage of the inductor sense signal $S_{IND}$ according to the embodiment of FIG. 3.

The diagrams of FIG. 4 illustrate the drive current $i_{DRIVE}$ and the voltage of the inductor sense signal $S_{IND}$. The waveform for the drive current $i_{DRIVE}$ is generally triangular, and the average drive current level $i_{AVE}$ is generally $i_{PEAK}/2$, wherein $i_{PEAK}$ is the peak level of the drive current $i_{DRIVE}$. The overall switching period and the duty cycle of the converter control signal $S_{CC}$ are adjusted to achieve the desired average drive current $i_{AVE}$.

Figure 5:
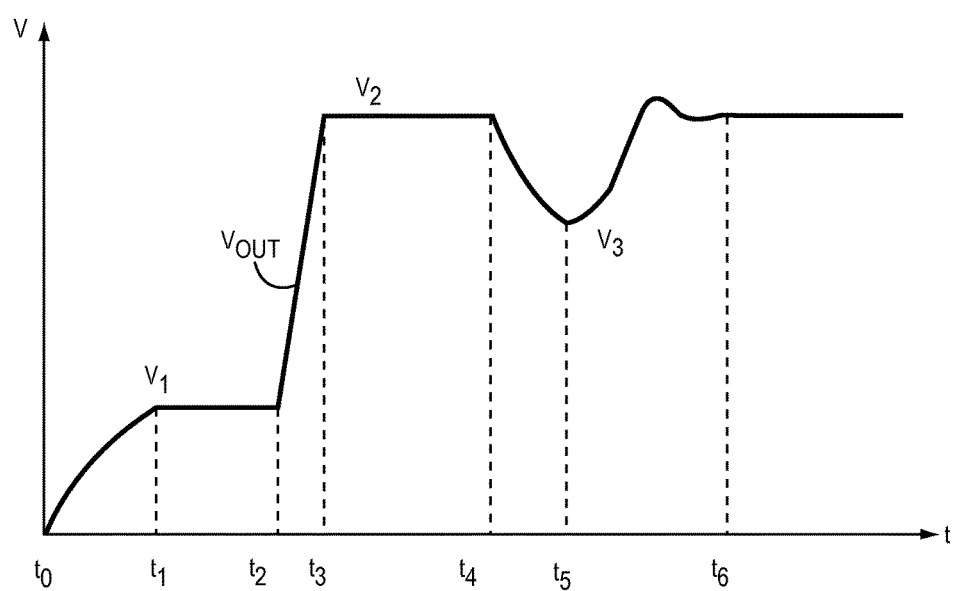
FIG. 5 is a graph that illustrates the power supply output signal according to one embodiment of the disclosure.

The following scenario describes how the power supply 12 and converter circuitry 14 operate without the temperature sensing circuitry 20. A description of how the these components work with the temperature sensing circuitry 20 follows this scenario and highlights the benefit of employing the temperature sensing circuitry 20 according to the concepts disclosed herein. Reference is made to FIG. 5, which illustrates the voltage ($V_{OUT}$) of the power supply output signal $S_{OUT}$. For conciseness, this voltage is simply referred to as the output voltage $V_{OUT}$. The output voltage $V_{OUT}$ corresponds to the voltage across output capacitor $C_1$.

When power is initially supplied to the power supply 12 at time t0, output capacitor $C_1$ is charged from zero volt to a voltage $V_1$ at time t1 via inductor $L_1$ and diode D5. At time t2, the PFC controller 32 starts operation and starts repeatedly switching transistor $Q_1$ on and off, as described above. Output capacitor $C_1$ charges up to voltage V2 from time t2 to time t3 and remains regulated by the PFC controller 32 until the converter circuitry 14 starts operation at time t4. Since the feedback loop of the PFC controller 32 has a relatively slow bandwidth of less than 20 Hertz (Hz), and thus responds relatively slowly to sudden load changes, the output voltage $V_{OUT}$ will sag from voltage $V_2$ to voltage $V_3$ from time t4 to time t5 when the converter circuitry 14 starts running. The extent of the sag (voltage $V_3$) in the output voltage $V_{OUT}$ at time t5 depends on the load presented by the converter circuitry 14 and capacitance of output capacitor $C_1$. A heavier load and lower output capacitance leads to greater sag (voltage $V_3$).

Figure 6:
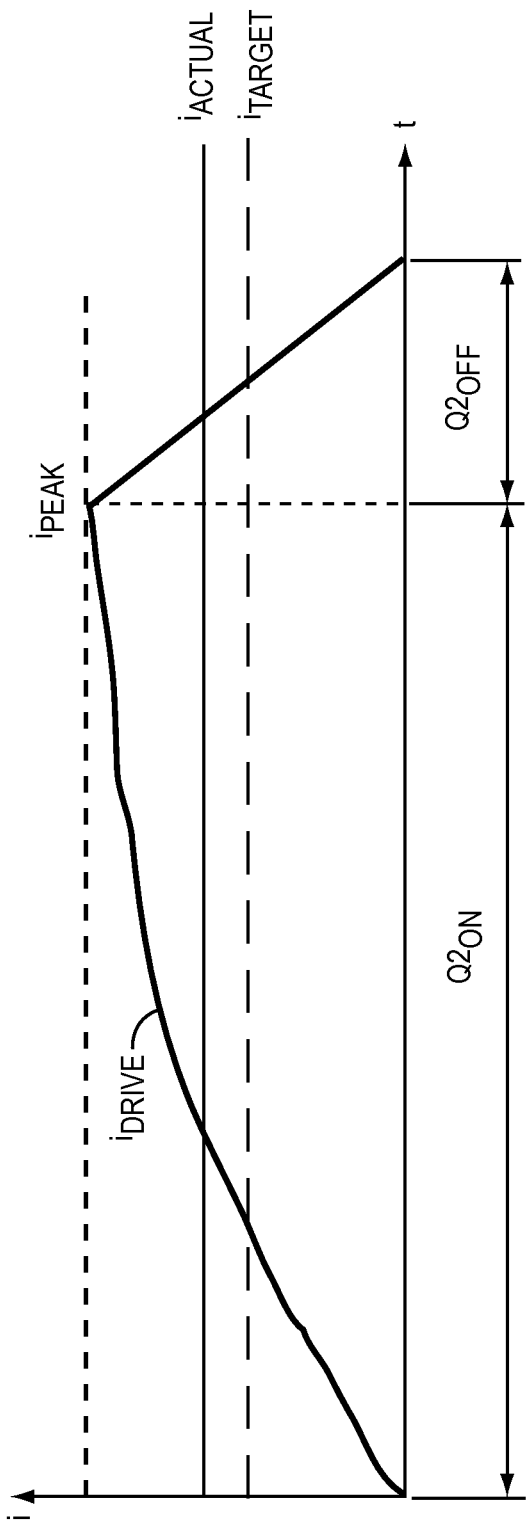
FIG. 6 is a graph that illustrates the drive current over a switching cycle according to one embodiment of the disclosure.

A challenging issue occurs as the converter circuitry 14 tries to instantly deliver the drive current $i_{DRIVE}$ at the full output level to the LED array 18. As the output voltage $V_{OUT}$ drops due to the sudden load, the voltage across inductor $L_{2A}$ also drops. As shown in FIG. 6, the slope of the drive current $i_{DRIVE}$ flowing through inductor $L_{2A}$ actually decreases because the voltage across output capacitor $C_2$, and thus, the voltage across the LED array 18, rises due to the charging current when transistor $Q_2$ is turned on. With a decreased slope, the drive current $i_{DRIVE}$ takes longer than normal to reach the desired peak current level $i_{PEAK}$. As such, the average drive level $i_{ACTUAL}$ of the drive current $i_{DRIVE}$ increases above the average target level $i_{TARGET}$ and the light output level from the LED array 18 increases above a target light output level. The control module 16 may provide over-current protection (OCP), wherein if the peak $i_{PEAK}$ or average drive $i_{ACTUAL}$ levels for the drive current $i_{DRIVE}$ exceed a defined OCP threshold, transistor $Q_2$ is turned off and kept in the off state for a set period of time, until the drive current $i_{DRIVE}$ drops to an acceptable level, or the like.

For cost or size reasons, it is often desirable to keep the size of output capacitors $C_1$ and $C_2$ as small as reasonably possible. Unfortunately, the capacitance of an electrolytic capacitor, including the capacitance of output capacitor $C_1$, which is normally an electrolytic capacitor, and output capacitor $C_2$, which can be an electrolytic capacitor, drops significantly at very low temperatures. For example, the capacitance of output electrolytic capacitors $C_1$ and $C_2$ at room temperature can drop by 50% or more at −40 C. As the capacitance of output capacitors $C_1$ and $C_2$ drop, the time in which transistor $Q_2$ is on during each switching cycle increases depending on the voltage across the inductor $L_{2A}$. As a result, the peak drive $i_{PEAK}$ or average drive $i_{ACTUAL}$ levels for the drive current $i_{DRIVE}$ through the LED array 18 may exceed the OCP threshold. When the OCP threshold is reached, the control module 16 will shut down the converter circuitry 14 by turning off transistor $Q_2$ until the drive current $i_{DRIVE}$ drops to an acceptable level or a set period of time has passed.

Once the converter circuitry 14 is shut down, the drive current $i_{DRIVE}$ starts to drop, and the light emitted from the LED array 18 drops precipitously. If the converter circuitry 14 is shut down long enough, the drive current $i_{DRIVE}$ will drop to zero, and the LED array 18 will not emit any light. The control module 16 will restart the converter circuitry 14 after the drive current $i_{DRIVE}$ drops to an acceptable level or a set time has passed. As such, the drive current $i_{DRIVE}$ is reapplied to the LED array 18, which will resume emitting light. If the temperature, and thus the capacitance of the output capacitor $C_1$, remains low, the peak drive $i_{PEAK}$ or average drive $i_{ACTUAL}$ levels for the drive current $i_{DRIVE}$ through the LED array 18 will again rise above the OCP threshold. The control module 16 will again shut down the converter circuitry 14 until the drive current $i_{DRIVE}$ drops to an acceptable level or a set period of time has passed. This scenario will repeat until the output capacitor $C_2$ warms enough for its capacitance to reach an acceptable level. Consequently, the light output from the LED array 18 will flash or flicker in a manner that is humanly perceptible. Although increasing the size of the output capacitors $C_1$ and $C_2$ might alleviate this problem, such a solution is often not practical due to size and cost constraints.

Figure 7A:
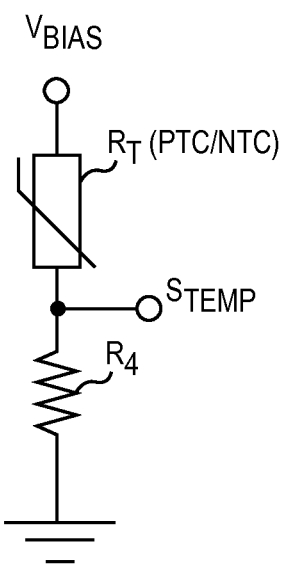
FIGS. 7A and 7B are schematics for two embodiments of the temperature sensing circuitry.
Figure 7B:
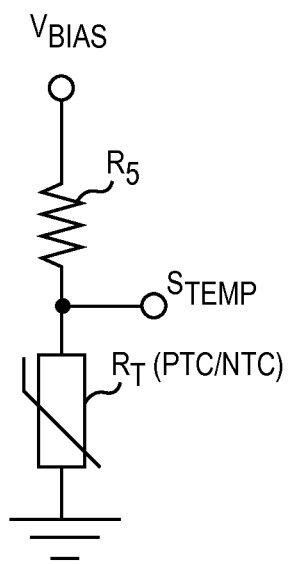

For the present disclosure, the control module 16 will use the temperature sensing circuitry 20 (FIGS. 1 and 3) to monitor the ambient temperature via a sensed temperature signal $S_{TEMP}$ and control the drive signal $i_{DRIVE}$ based on the ambient temperature, as described above. The temperature sensing circuitry 20 may take many forms. Two examples that use a fixed resistance resistor $R_4$ and a temperature sensor $R_T$, such as a thermistor, are provided in FIGS. 7A and 7B. The temperature sensor $R_T$ can be a PTC (positive temperature coefficient) or an NTC (negative temperature coefficient) resistor in either scenario, as those skilled in the art will appreciate. In FIG. 7A, the sensed temperature signal $S_{TEMP}$ corresponds to $V_{BIAS}*R_6/(R_6+R_T)$. In FIG. 7B, the sensed temperature signal $S_{TEMP}$ corresponds to $V_{BIAS}*R_T/$ ($R_6+R_T$). In either scenario, $R_6$ is a fixed resistance of resistor $R_6$, $R_T$ is a variable resistance that varies with temperature in a known manner, and $V_{BIAS}$ is a fixed reference voltage.

In operation, the control module 16 will determine the ambient temperature based on the sensed temperature signal $S_{TEMP}$ at startup and on a periodic basis during operation. If the temperature is above a set temperature threshold, the control module 16 will control the converter control signal $S_{CC}$ to quickly ramp up the (average) drive signal $i_{DRIVE}$ from zero to the target drive level $i_{TARGET}$ with little or no humanly perceptible delay. For example, the drive signal $i_{DRIVE}$ may ramp from zero to the drive signal $i_{DRIVE}$ in less than 500 milliseconds. Alternatively, the control module 16 will control the converter control signal $S_{CC}$ to immediately provide the drive signal $i_{DRIVE}$ at the target drive level $i_{TARGET}$. Again, the target drive level $i_{TARGET}$ may be the full rated output level or a reduced output level based on dimming information.

If the ambient temperature is below the temperature threshold, the control module 16 will control the converter control signal $S_{CC}$ to provide the drive signal $i_{DRIVE}$ at a reduced drive level $i_{REDUCED}$ for a set period of time or until the ambient temperature rises above the temperature threshold. As described below, the reduced drive level $i_{REDUCED}$ may remain constant or vary as a function of temperature, time, or a combination thereof. Four non-limiting examples of controlling the drive signal $i_{DRIVE}$ at reduced drive levels $i_{REDUCED}$ are provided below in association with FIGS. 8A through 8B.

Figure 8A:
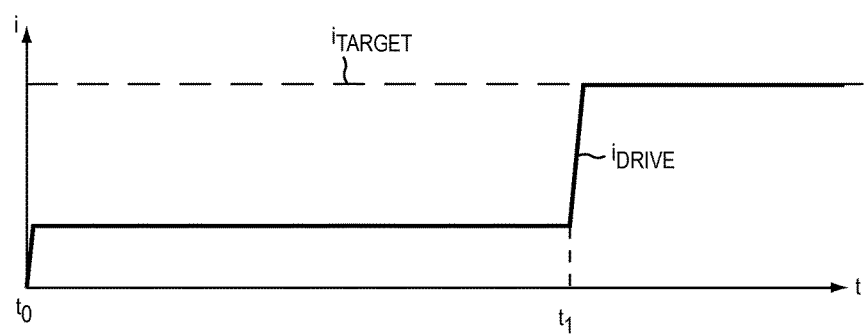
FIGS. 8A through 8D illustrate four unique profiles for the drive current when low temperature conditions are detected.

Reference is now made to FIG. 8A. At startup (t0) and when the ambient temperature is below the temperature threshold, the drive signal $i_{DRIVE}$ is immediately brought to a reduced drive level $i_{REDUCED}$ that is fixed until time t1. At time t1, the drive signal $i_{DRIVE}$ is immediately brought to the target drive level $i_{TARGET}$. In one embodiment, time t1 may correspond to a predefined period of time wherein the control module 16 simply sets the drive signal $i_{DRIVE}$ at a fixed level that is less than the target drive level $i_{TARGET}$ for a predefined period of time that ends at time t1.

The predefined period may be fixed for all temperatures below the threshold temperature, or may be a function of the ambient temperature. As such, the predefined period may vary based on the ambient temperature that is measured at startup (t0). In another embodiment, time t1 may correspond to the ambient temperature rising above the temperature threshold. As such, the control module 16 will set the drive signal $i_{DRIVE}$ at the fixed level that is less than the target drive level $i_{TARGET}$ until the ambient temperature rises above the temperature threshold.

Figure 8B:
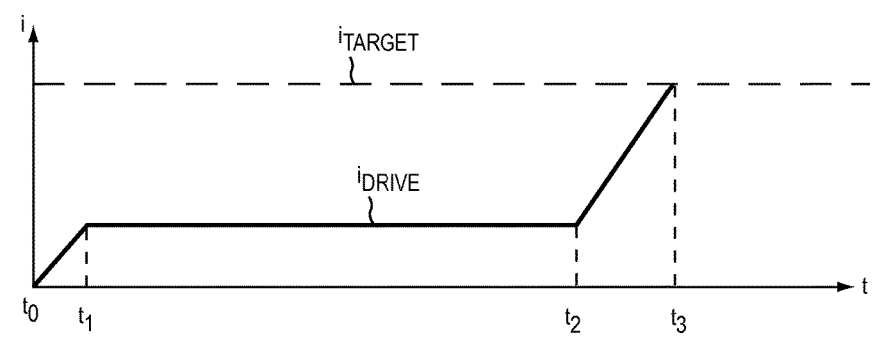

With reference to FIG. 8B, a variant on the above control scheme is provided. In this variant, the reduced drive level $i_{REDUCED}$ of the drive signal $i_{DRIVE}$ is ramped up relatively slowly from zero to a fixed level from startup (t0) to time t1 and held at the fixed level from time t1 to time t2. At time t2, the reduced drive level $i_{REDUCED}$ of the drive signal $i_{DRIVE}$ is ramped up to the target drive level $i_{TARGET}$. In one embodiment, times t1 and t2 may correspond to a predefined periods. Each predefined period may be fixed for all temperatures below the threshold temperature or a function of the ambient temperature. The slope, shape, and timing for each ramp may be fixed or a function of the ambient temperature or time.

In another embodiment, time t1 one may be predefined and time t2 may correspond to the ambient temperature rising above the temperature threshold. As such, the control module 16 will slowly ramp the drive signal $i_{DRIVE}$ to a first level that is less than the target drive level $i_{TARGET}$ until the ambient temperature rises above the temperature threshold. At that point, the control module 16 will slowly ramp the drive signal $i_{DRIVE}$ from the first level to the target drive level $i_{TARGET}$.

Figure 8C:
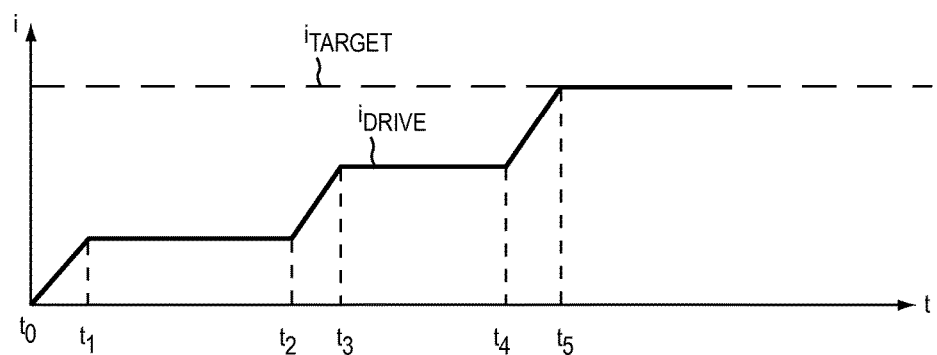

FIG. 8C illustrates the use of at least two fixed levels for the reduced drive level $i_{REDUCED}$ and ramping between all levels. In this variant, the reduced drive level $i_{REDUCED}$ of the drive signal $i_{DRIVE}$ is ramped up relatively slowly from zero to a first fixed level from startup (t0) to time t1 and held at the first fixed level from time t1 to t2. The reduced drive level $i_{REDUCED}$ of the drive signal $i_{DRIVE}$ is ramped up relatively slowly from the first fixed level to a second fixed level from time t2 to time t3 and held at the second fixed level from time t3 to time t4. At time t4, the reduced drive level $i_{REDUCED}$ of the drive signal $i_{DRIVE}$ is ramped up relatively slowly to the target drive level $i_{TARGET}$. In one embodiment, times t1, t2, t3, and t4 may correspond to a predefined periods. Each predefined period may be fixed for all temperatures below the threshold temperature or a function of the ambient temperature. As noted above, the slope, shape, and timing for each ramp may be fixed or a function of the ambient temperature or time.

In another embodiment, times t2, t4, or both may correspond to the ambient temperature rising above different temperature thresholds. As such, the control module 16 will slowly ramp the drive signal $i_{DRIVE}$ to the first fixed level that is less than the target drive level $i_{TARGET}$ until the ambient temperature rises above the first temperature threshold. At that point, the control module 16 will slowly ramp the drive signal $i_{DRIVE}$ to the second fixed level until the ambient temperature rises above the second temperature threshold before ramping the drive signal $i_{DRIVE}$ to the target drive level $i_{TARGET}$.

Figure 8D:
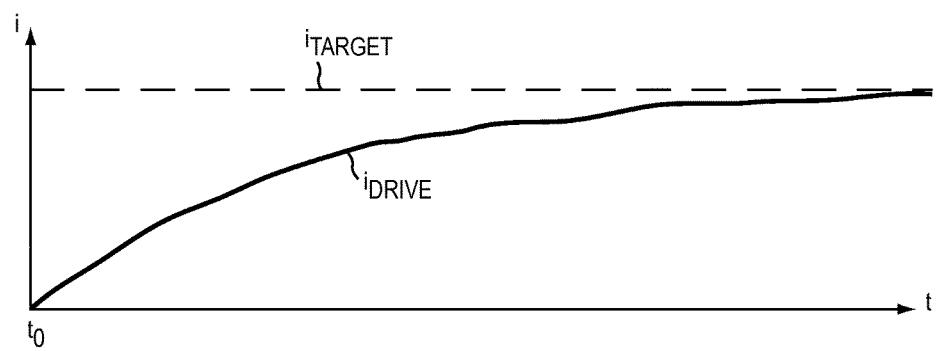

FIG. 8D illustrates the drive signal $i_{DRIVE}$ ramping from zero at startup (t0) to the target drive level $i_{TARGET}$ in a non-linear fashion. As illustrated, the reduced drive level $i_{REDUCED}$ increases with a decreasing slope as a function of time. Alternatively, the reduced drive level $i_{REDUCED}$ could also ramp linearly (with a fixed slope) or non-linearly with an increasing slope. The time required to reach the target drive level $i_{TARGET}$ may be fixed or a function of ambient temperature.

For illustrative purposes only, the ramping between levels for any of the above embodiments may be linear or non-linear and range between 1 and 10 seconds, wherein the overall time between startup and reaching the target drive level $i_{TARGET}$ for the drive signal $i_{DRIVE}$ may be greater than 60 seconds.

While only one converter circuitry 14 is illustrated above, the LED array 18 may include multiple strings of LEDs wherein each string is driven by different converter circuitry 14. Different strings of LEDs may have LEDs of the same or different colors and may require the same or different drive signals $i_{DRIVE}$ as other strings of LEDs.

Those skilled in the art will recognize improvements and modifications to the preferred embodiments of the present disclosure. All such improvements and modifications are considered within the scope of the concepts disclosed herein and the claims that follow.

What is claimed is:
1. A lighting fixture comprising:
 a power supply having an output capacitor with capacitance that decreases as a function of ambient temperature;
 a solid state light source;
 temperature sensing circuitry;

converter circuitry adapted to receive power from the power supply and provide a drive signal to the solid state light source; and a control module adapted to:
  shut off the drive signal to the solid state light source for a predetermined time when the drive signal is above an over-current protection threshold;
  determine an ambient temperature based on information from the temperature sensing circuitry;
  when the ambient temperature is above an ambient temperature threshold, cause the converter circuitry to provide the drive signal at a target drive level; and
  respond to the ambient temperature being below the ambient temperature threshold, indicating a potential over-current condition due to a decrease in capacitance of the output capacitor, by causing the converter circuitry to provide the drive signal at a reduced drive level that is lower than the target drive level, wherein providing the drive signal at the reduced drive level comprises ramping the drive signal up to the target drive level over a period of time that is a function of the ambient temperature.

2. The lighting fixture of claim 1 wherein during an initial power-up sequence, the control module is further configured to avoid providing the drive signal until a determination is made as to whether to provide the drive signal at the target drive level or the reduced drive level.

3. The lighting fixture of claim 1 wherein the control module is further configured to cause the converter circuitry to provide the drive signal at the target drive level, and upon determining that the ambient temperature is below the ambient temperature threshold, cause the converter circuitry to provide the drive signal at the reduced drive level.

4. The lighting fixture of claim 1 wherein the control module is further configured to receive dimming information and determine a dimming drive level based on the dimming information.

5. The lighting fixture of claim 4 wherein when the ambient temperature is below the ambient temperature threshold, the control module is further configured to:
  when the dimming drive level is less than the reduced drive level, cause the converter circuitry to provide the drive signal at the dimming drive level; and
  when the dimming drive level is above the reduced drive level, cause the converter circuitry to provide the drive signal at the reduced drive level.

6. The lighting fixture of claim 1 wherein the drive signal is continuously ramped up to the target drive level.

7. The lighting fixture of claim 1 wherein the drive signal is continuously ramped up to the target drive level in a substantially linear fashion.

8. The lighting fixture of claim 1 wherein the drive signal is continuously ramped up to the target drive level in a non-linear fashion.

9. The lighting fixture of claim 8 wherein as the drive signal ramps up to the target drive level, the drive signal increases such that a slope of the drive signal decreases over time.

10. The lighting fixture of claim 8 wherein as the drive signal ramps up to the target drive level, the drive signal increases such that a slope of the drive signal increases over time.

11. The lighting fixture of claim 1 wherein the providing the drive signal at the reduced drive level comprises providing the drive signal at a first fixed level that is less than the target drive level for a first period of time.

12. The lighting fixture of claim 11 wherein the drive signal is ramped up to the first fixed level and from the first fixed level to the target drive level.

13. The lighting fixture of claim 1 wherein the providing the drive signal at the reduced drive level comprises providing the drive signal at a first fixed level that is less than the target drive level for a first period of time and then at a second fixed level that is greater than the first fixed level and less than the target drive level for a second period of time.

14. The lighting fixture of claim 13 wherein the drive signal is ramped up to the first fixed level, from the first fixed level to the second fixed level, and from the second fixed level to the target drive level.

15. The lighting fixture of claim 1 wherein the solid state light source comprises at least one string of LEDs.

16. The lighting fixture of claim 1 wherein the converter circuitry is one of a group consisting of a buck converter, a boost converter, and a buck-boost converter.

17. The lighting fixture of claim 1 wherein the power supply is configured to receive an AC supply signal, convert the AC supply signal to a DC output signal, and provide power factor correction when converting the AC supply signal to the DC output signal such that the power provided to the converter circuitry is provided by the DC output signal.

18. The lighting fixture of claim 1 wherein the converter circuitry comprises an inductor in series with the solid state light source and a switching transistor that is switched on and off by the control module to set a current level of the drive signal, wherein the drive signal flows through the inductor and the solid state light source.

19. The lighting fixture of claim 18 wherein the temperature sensing circuitry comprises a voltage divider circuit with at least one resistor with at least one of a positive temperature coefficient and a negative temperature coefficient.

20. The lighting fixture of claim 1 wherein the power supply comprises an inductor and a transistor arranged such that switching the transistor on and off controls a current flowing through the inductor and a voltage stored in the output capacitor, such that the voltage stored in the output capacitor correspond to an output voltage of the power provided to the converter circuitry by the power supply.

* * * * *